(12) United States Patent
Hu et al.

(10) Patent No.: US 12,244,541 B2
(45) Date of Patent: Mar. 4, 2025

(54) DESIGNS OF DISTRIBUTED-TONE RESOURCE UNITS ON PARTIAL BANDWIDTH

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 231 days.

(21) Appl. No.: 17/718,086

(22) Filed: Apr. 11, 2022

(65) Prior Publication Data
US 2022/0329397 A1    Oct. 13, 2022

Related U.S. Application Data

(60) Provisional application No. 63/173,531, filed on Apr. 12, 2021.

(51) Int. Cl.
| | |
|---|---|
| *H04L 12/26* | (2006.01) |
| *H04L 1/08* | (2006.01) |
| *H04L 5/00* | (2006.01) |

(52) U.S. Cl.
CPC .............. *H04L 5/0092* (2013.01); *H04L 1/08* (2013.01); *H04L 5/0078* (2013.01); *H04L 5/0094* (2013.01)

(58) Field of Classification Search
None
See application file for complete search history.

(56) References Cited

U.S. PATENT DOCUMENTS

2021/0288769 A1*  9/2021  Yang ..................... H04L 5/0041

FOREIGN PATENT DOCUMENTS

WO    WO-2017003229 A1 *  1/2017  ......... H04L 27/2601

* cited by examiner

*Primary Examiner* — Zewdu A Beyen
(74) *Attorney, Agent, or Firm* — Andy M. Han; Han IP PLLC

(57) ABSTRACT

Various schemes pertaining to designs of distributed-tone resource units (dRUs) on a partial bandwidth in a 6 GHz low-power indoor (LPI) system are described. An apparatus distributes a plurality of subcarriers of a resource unit (RU) to generate a dRU over a partial bandwidth of a bandwidth. The apparatus then communicates with a communication entity using the dRU.

8 Claims, 8 Drawing Sheets

| RU size | RUstart | {li} |
|---|---|---|
| 26 | {0,15,6,21,12,3,18,9,24,1,16,7,22,13,4,19,10,25,2,17,8,23,14,5,20,11,26} | {0} |
| 52 | {0,6,3,9,1,7,4,10,2,8,5,11} | {0,15} |
| 106 | {0,3,1,4,2,5} | {0,6,15,21} |
| 242 | {0,1,2} | {0:3:24} |

FIG. 2

| | Distributed over 60MHz (RU242+484) | |
|---|---|---|
| | # tone/MHz | Power Boost (dB) |
| RU26 | 1 | 11.14 |
| RU52 | 1 | 11.14 |
| RU78 (26+52) | 2 | 8.13 |
| RU106 | 2 | 8.13 |
| RU132 (26+106) | 3 | 6.37 |
| RU242 | 5 | 4.15 |
| RU484 | na | na |

DESIGNS OF DISTRIBUTED-TONE RESOURCE UNITS ON PARTIAL BANDWIDTH

CROSS REFERENCE TO RELATED PATENT APPLICATION

The present disclosure is part of a non-provisional patent application claiming the priority benefit of U.S. Provisional Patent Application No. 63/173,531, filed 12 Apr. 2021, the content of which being incorporated by reference in its entirety.

TECHNICAL FIELD

The present disclosure is generally related to wireless communications and, more particularly, to designs of distributed-tone resource units (RUs) on a partial bandwidth in a 6 GHz low-power indoor (LPI) system.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4 GHz and 5 GHz bands, the equivalent isotropically radiated power (EIRP) of a power spectral density (PSD) limit is capped at 20 dBm for 2 MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6 GHz LPI applications is far more stringent than PSD requirement for the 2.4 GHz and 5 GHz bands. For instance, the EIRP limit is at 5 dBm/MHz for an access point (AP) station (STA) in 6 GHz LPI versus an EIRP limit of 17 dBm/MHz for APs in the 5 GHz band. Similarly, the EIRP limit is at −1 dBm/MHz for an non-AP STA in 6 GHz LPI versus an EIRP limit of 11 dBm/MHz for APs in the 5 GHz band.

Distributed-tone RUs (dRUs) and distributed-tone multi-RUs (dMRUs) have been proposed to spread subcarriers or tones over a wider bandwidth to boost transmit power and extend coverage range. Currently, 20 MHz operating non-AP STAs are supported under the Institute of Electrical and Electronics Engineers (IEEE) 802.11 standard for regular RU (rRU) and multi-RU (MRU) transmissions. It is thus reasonable to assume that 20 MHz operating STA with either rRU or dRU transmission in a 6 GHz LPI system is supported. In an 80 MHz bandwidth (or 80 MHz frequency segment or subblock), if some 20 MHz operating STAs transmit rRU or dRU on one 20 MHz frequency subblock of multiple 20 MHz frequency subblocks, then the remaining 60 MHz of the 80 MHz bandwidth/frequency subblock could be used either for rRU/MRU transmissions or for dRU/MRU transmissions. Therefore, there is a need for a solution on designs of dRUs on a partial bandwidth in a 6 GHz LPI system.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to designs of dRUs on a partial bandwidth in a 6 GHz LPI system.

In one aspect, a method may involve distributing a plurality of subcarriers of a RU to generate a dRU over a partial bandwidth of a bandwidth. The method may also involve communicating with a communication entity using the dRU.

In yet another aspect, an apparatus may include a transceiver configured to transmit and receive wirelessly. The apparatus may also include a processor coupled to the transceiver. The processor may distribute a plurality of subcarriers of RU to generate a dRU over a partial bandwidth of a bandwidth. The processor may also communicate, via the transceiver, with a communication entity (e.g., an AP STA or non-AP STA) using the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 5 is a diagram of an example scenario in accordance with an implementation of the present disclosure.

DETAILED DESCRIPTION OF PREFERRED EMBODIMENTS

Figure 1:
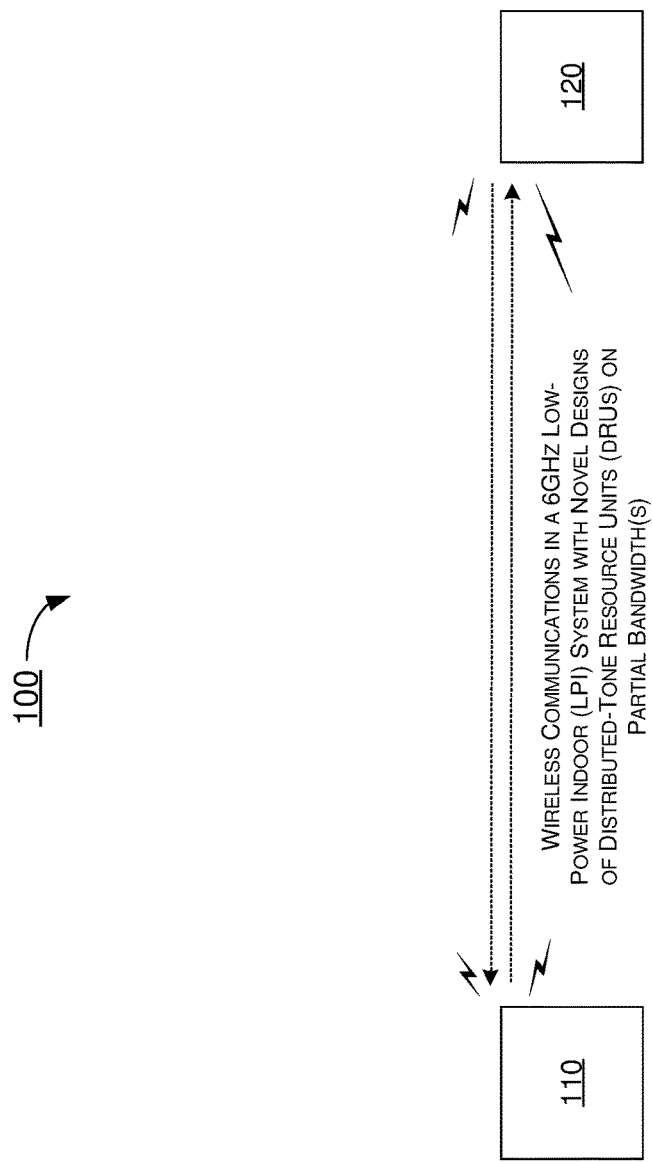
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to designs of dRUs on a partial bandwidth in a 6 GHz LPI system. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M. It is further noteworthy that, in the present disclosure, a 26-tone interleaved-tone or interlaced-tone RU may be interchangeably denoted as iRU26, a 52-tone interleaved-tone or interlaced-tone RU may be interchangeably denoted as iRU52, a 106-tone interleaved-tone or interlaced-tone RU may be interchangeably denoted as iRU106, a 242-tone interleaved-tone or interlaced-tone RU may be interchangeably denoted as iRU242, and a 484-tone interleaved-tone or interlaced-tone RU may be interchangeably denoted as iRU484. Additionally, the term "frequency segment" is interchangeably referred to as "frequency subblock" herein.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve a communication entity 110 and a communication entity 120 communicating wirelessly (e.g., in a wireless local area network (WLAN) in accordance with one or more IEEE 802.11 standards). For instance, communication entity 110 may be a first STA and communication entity 120 may be a second STA, with each of the first STA and second STA functioning as either an AP STA or a non-AP STA. Under various proposed schemes in accordance with the present disclosure, communication entity 110 and communication entity 120 may be configured to communicate wirelessly with designs of dRUs on a partial bandwidth in a 6 GHz LPI system under various proposed schemes of the present disclosure, as described herein.

Under a proposed scheme in accordance with the present disclosure, given a distribution bandwidth and a logical RU size, the tone distribution pattern of a dRU may be generated based on a formula as follows:

$$K_{td}(r,k) = RU_{start}(r) + l_{(i)} + j*N_p$$

Here, $N_p$ denotes a periodicity or repetition period (e.g., in number of tones); $l_{(i)}$ denotes a tone distribution pattern within one repetition period (e.g., every two or $$\left\lceil \frac{N_{st\_ru}}{L} \right\rceil - 1;$$

k=0, 1, 2, ..., $N_{st\_ru}$−1; r=1, 2, ..., $N_{ru}$, with r being the logical RU index. Moreover, $l_{(i)} \in \Omega_{ru} = \{l_{(0)}, l_{(1)}, \ldots, l_{(L-1)}\}$; L=$|\Omega_{ru}|$; $N_{st\_ru}$=26, 52, 106, 242, 484, 996 for RU26, RU52, RU106, RU242, RU484, RU996, respectively. Additionally, $RU_{start}(r)$ represents the first or starting tone index for $dRU_r$; $l_{(i)}$ represents the tones within one repetition distance or one repetition period; $N_p$ represents the repetition distance or repetition period; L represents the number of tones within one repetition distance or one repetition period; $N_{st\_ru}$ represents the number of subcarriers (or tones) for a dRU; and $N_{ru}$ represents the number of RUs for a given RU size in a given bandwidth.

FIG. 2 illustrates an example design 200 of parameters of dRUs on a partial bandwidth of a 60 MHz partial bandwidth under a proposed scheme in accordance with the present disclosure. In design 200, $N_p$=27. Under the proposed scheme, the maximum number of dRU26 supported in the 60 MHz partial bandwidth may be 27, the maximum number of dRU52 supported in the 60 MHz partial bandwidth may be 12, the maximum number of dRU106 supported in the 60 MHz partial bandwidth may be 6, and the maximum number of dRU242 supported in the 60 MHz partial bandwidth may be 3.

Figure 3:
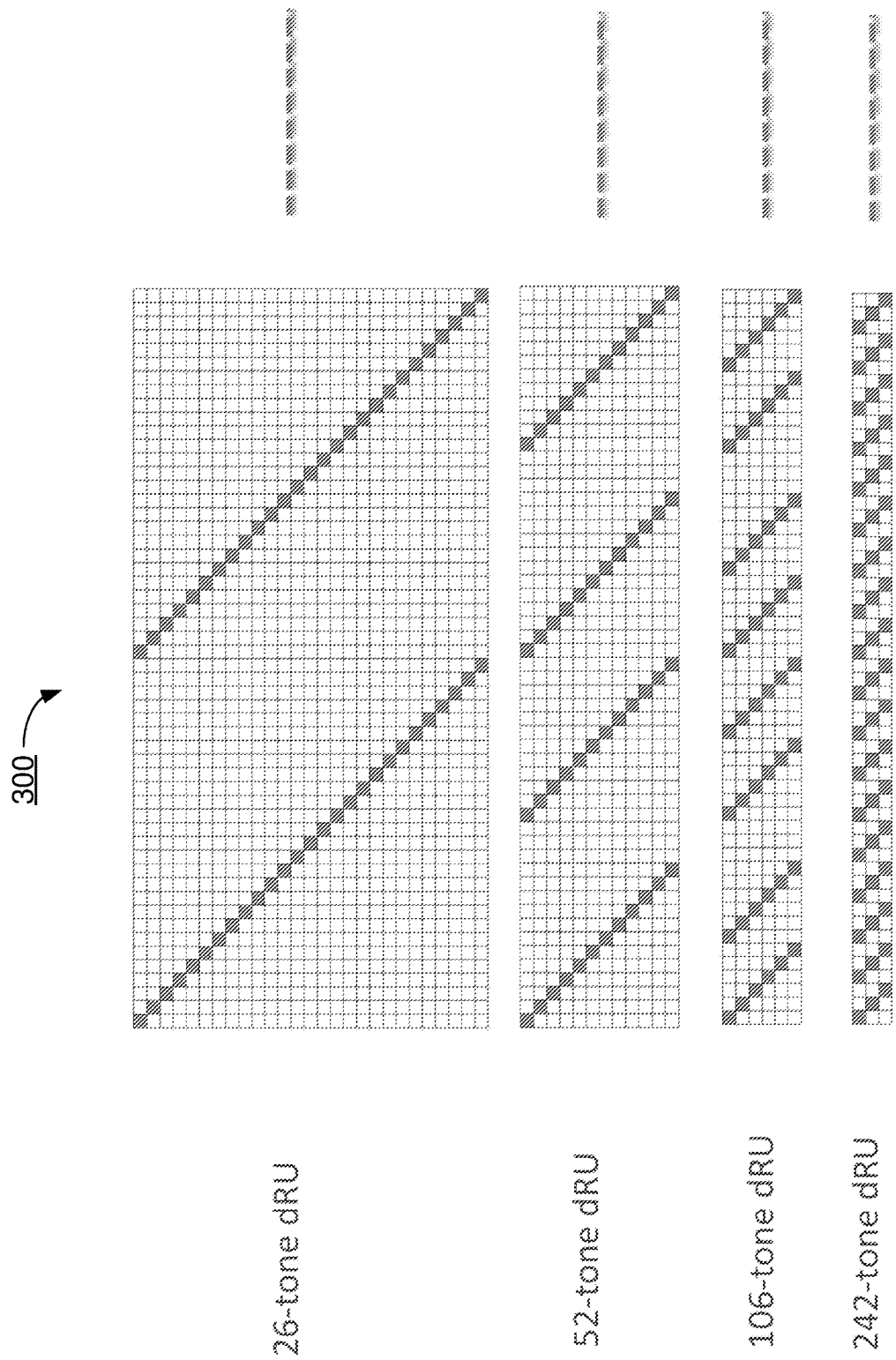
FIG. 3 is a diagram of an example design in accordance with an implementation of the present disclosure.

FIG. 3 illustrates an example design 300 of tone distribution patterns of dRUs on a partial bandwidth under a proposed scheme in accordance with the present disclosure. Referring to FIG. 3, design 300 provides a respective tone distribution pattern for each of a 26-tone dRU (dRU26), 52-tone dRU (dRU52), 106-tone dRU (dRU106) and 242- tone dRU (dRU242) in a 60 MHz partial bandwidth of an 80 MHz bandwidth or frequency subblock. That is, the tone distribution patterns of design 300 may be applied in various implementations of dRUs on partial bandwidths in accordance with the present disclosure.

Figure 4:
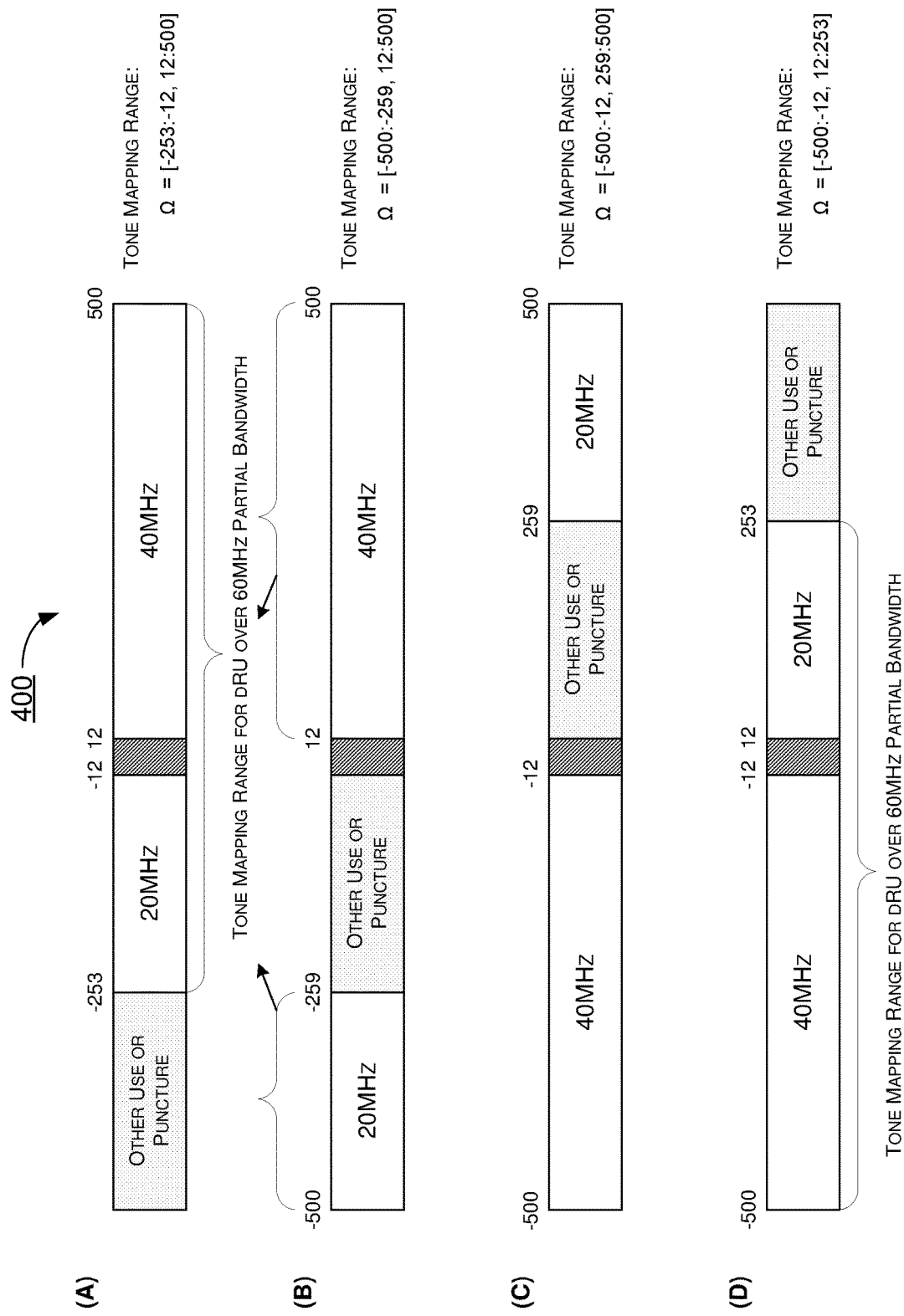
FIG. 4 is a diagram of an example design in accordance with an implementation of the present disclosure.

FIG. 4 illustrates an example design 400 of tone mapping ranges for dRUs on a partial bandwidth under a proposed scheme in accordance with the present disclosure. Referring to FIG. 4, design 400 provides a respective tone mapping range in a 60 MHz partial bandwidth of an 80 MHz bandwidth or frequency subblock for each of four scenarios (A), (B), (C) and (D). In scenario (A), the first 20 MHz frequency subblock of four 20 MHz frequency subblocks in the BW80M is used for other purposes or otherwise punctured, and thus the tones of a dRU may be distributed on the 60 MHz partial bandwidth composed of the second 20 MHz frequency subblock and a second 40 MHz frequency subblock (including the third 20 MHz frequency subblock plus the fourth 20 MHz frequency subblock). Correspondingly, the tone mapping range (denoted by "Ω" in FIG. 4) in scenario (A) may be [−253:−12, 12:500]. In scenario (B), the second 20 MHz frequency subblock of four 20 MHz frequency subblocks in the BW80M is used for other purposes or otherwise punctured, and thus the tones of a dRU may be distributed on the 60 MHz partial bandwidth composed of the first 20 MHz frequency subblock and the second 40 MHz frequency subblock (including the third 20 MHz frequency subblock plus the fourth 20 MHz frequency subblock). Correspondingly, the tone mapping range in scenario (B) may be [−500:−259, 12:500]. In scenario (C), the third 20 MHz frequency subblock of four 20 MHz frequency subblocks in the BW80M is used for other purposes or otherwise punctured, and thus the tones of a dRU may be distributed on the 60 MHz partial bandwidth composed of the fourth 20 MHz frequency subblock and a first 40 MHz frequency subblock (including the first 20 MHz frequency subblock plus the second 20 MHz frequency subblock). Correspondingly, the tone mapping range in scenario (C) may be [−500:−12, 259:500]. In scenario (D), the fourth 20 MHz frequency subblock of four 20 MHz frequency subblocks in the BW80M is used for other purposes or otherwise punctured, and thus the tones of a dRU may be distributed on the 60 MHz partial bandwidth composed of the third 20 MHz frequency subblock and the first 40 MHz frequency subblock (including the first 20 MHz frequency subblock plus the second 20 MHz frequency subblock). Correspondingly, the tone mapping range in scenario (D) may be [−500:−12, 12:253].

Under a proposed scheme in accordance with the present disclosure, generation of dRU subcarrier indices for partial bandwidth (e.g., 60 MHz) may be expressed as $dRU(r, k) = \Omega(K_{td}(r, k))$. Here, $\Omega$ denotes the tone mapping range corresponding to the size of the dRU as defined in design 400 and shown in FIG. 4. Moreover, $K_{td}(r, k)$ is calculated as described above. Additionally, r denotes the dRU index, and k denotes the natural index or order of dRU subcarriers, $k = 0, 1, \ldots, N_{st}-1$, with $N_{st}$ representing a number of subcarriers associated with the dRU.

FIG. 5 illustrates an example scenario 500 of performance of dRUs on a partial bandwidth under a proposed scheme in accordance with the present disclosure. In scenario 500, the performance of distribution of each of various dRUs and MRUs over a 60 MHz partial bandwidth is shown in terms of power boost (in units of dB).

Figure 6:
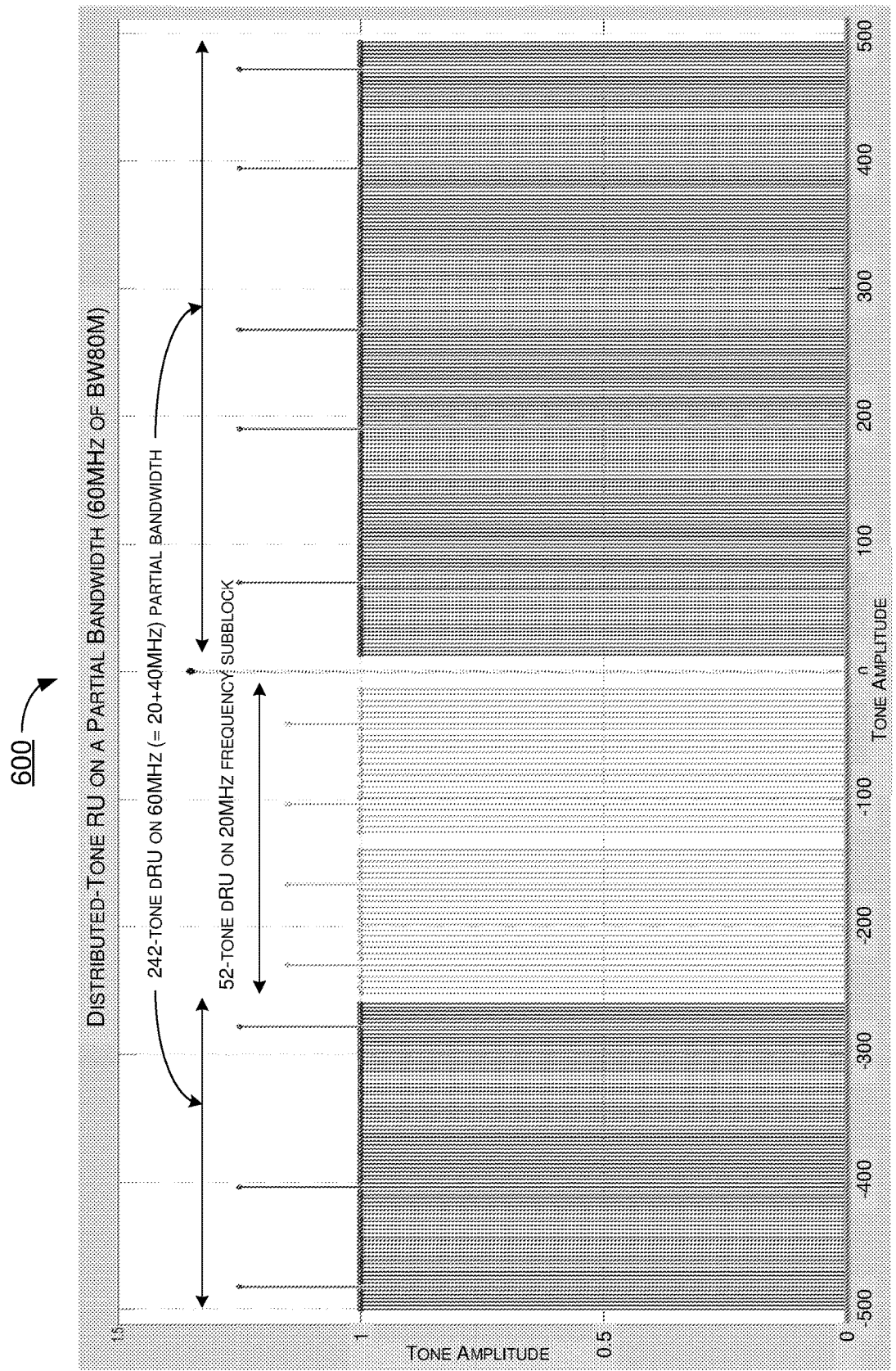
FIG. 6 is a diagram of an example scenario in accordance with an implementation of the present disclosure.

FIG. 6 illustrates an example scenario 600 of a distribution of a dRU over a 60 MHz partial bandwidth of an 80 MHz bandwidth or frequency subblock under a proposed scheme in accordance with the present disclosure. In scenario 600, a 52-tone dRU (dRU52) is distributed over the second 20 MHz frequency subblock of the BW80M while a 242-tone dRU (dRU242) is distributed over the remaining 60 MHz partial bandwidth (composed of the first 20 MHz frequency subblock and a second 40 MHz frequency subblock).

Illustrative Implementations

Figure 7:
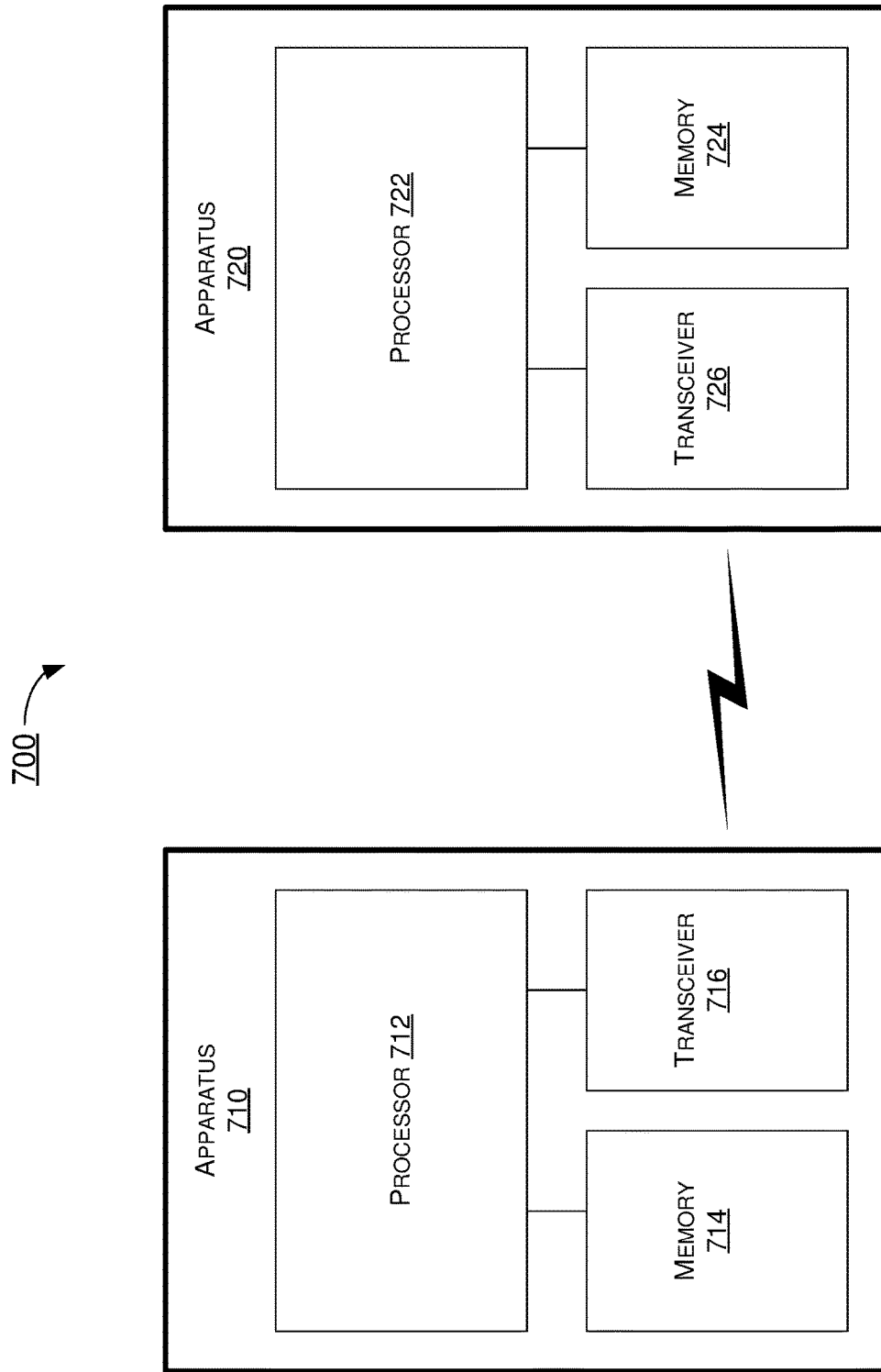
FIG. 7 is a block diagram of an example communication system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to subcarrier indices for distributed-tone RUs (dRU) in 6 GHz LPI systems, including the various schemes described above with respect to various proposed designs, concepts, schemes, systems and methods described above as well as processes described below. For instance, apparatus 710 may be an example implementation of communication entity 110, and apparatus 720 may be an example implementation of communication entity 120.

Each of apparatus 710 and apparatus 720 may be a part of an electronic apparatus, which may be a STA or an AP, such as a portable or mobile apparatus, a wearable apparatus, a wireless communication apparatus or a computing apparatus. For instance, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a network node, such as an AP in a WLAN.

In some implementations, each of apparatus 710 and apparatus 720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 710 and apparatus 720 may be implemented in or as a STA or an AP. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, one or more RISC processors or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to designs of dRUs on a partial bandwidth in a 6 GHz LPI system in accordance with various implementations of the present disclosure. For instance, each of processor 712 and processor 722 may be configured with hardware components, or circuitry, implementing one, some or all of the examples described and illustrated herein.

In some implementations, apparatus 710 may also include a transceiver 716 coupled to processor 712. Transceiver 716 may be capable of wirelessly transmitting and receiving data. In some implementations, apparatus 720 may also include a transceiver 726 coupled to processor 722. Transceiver 726 may include a transceiver capable of wirelessly transmitting and receiving data.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as communication entity 110, and apparatus 720, as communication entity 120, is provided below. It is noteworthy that, although the example implementations described below are provided in the context of WLAN, the same may be implemented in other types of networks. Thus, although the following description of example implementations pertains to a scenario in which apparatus 710 functions as a transmitting device and apparatus 720 functions as a receiving device, the same is also applicable to another scenario in which apparatus 710 functions as a receiving device and apparatus 720 functions as a transmitting device.

Under a proposed scheme in accordance with the present disclosure with respect to designs of dRUs on a partial bandwidth in a 6 GHz LPI system, processor 712 of apparatus 710 may distribute a plurality of subcarriers of a RU to generate a dRU over a partial bandwidth of a bandwidth. Additionally, processor 712 may communicate, via transceiver 716, with a communication entity (e.g., apparatus 720) using the dRU.

In some implementations, in distributing the plurality of subcarriers of the RU to generate the dRU over the partial bandwidth, processor 712 may distribute the plurality of subcarriers of the RU to generate twenty-seven 26-tone dRUs over a 60 MHz partial bandwidth. In some implementations, first or starting tone indices of the twenty-seven 26-tone dRUs over the 60 MHz partial bandwidth may include {0, 15, 6, 21, 12, 3, 18, 9, 24, 1, 16, 7, 22, 13, 4, 19, 10, 25, 2, 17, 8, 23, 14, 5, 20, 11, 26}, with a repetition period of 27, and tones within one repetition period may include {0}.

In some implementations, in distributing the plurality of subcarriers of the RU to generate the dRU over the partial bandwidth, processor 712 may distribute the plurality of subcarriers of the RU to generate twelve 52-tone dRUs over a 60 MHz partial bandwidth. In some implementations, first or starting tone indices of the twelve 52-tone dRUs over the 60 MHz partial bandwidth may include {0, 6, 3, 9, 1, 7, 4, 10, 2, 8, 5, 11}, with a repetition period of 27, and tones within one repetition period may include {0, 15}.

In some implementations, in distributing the plurality of subcarriers of the RU to generate the dRU over the partial bandwidth, processor 712 may distribute the plurality of subcarriers of the RU to generate six 106-tone dRUs over a 60 MHz partial bandwidth. In some implementations, first or starting tone indices of the six 106-tone dRUs over the 60 MHz partial bandwidth may include {0, 3, 1, 4, 2, 5}, with a repetition period of 27, and tones within one repetition period may include {0, 6, 15, 21}.

In some implementations, in distributing the plurality of subcarriers of the RU to generate the dRU over the partial bandwidth, processor 712 may distribute the plurality of subcarriers of the RU to generate three 242-tone dRUs over a 60 MHz partial bandwidth. In some implementations, first or starting tone indices of the three 242-tone dRUs over the 60 MHz partial bandwidth may include {0, 1, 2}, with a repetition period of 27, and tones within one repetition period may include {0:3:24}.

In some implementations, the partial bandwidth may include a 60 MHz partial bandwidth. Moreover, the bandwidth may be an 80 MHz bandwidth with a first 20 MHz frequency subblock of the 80 MHz bandwidth not having the dRU distributed thereon. In such cases, a tone mapping range of a plurality of tones of the dRU may include [−253:−12, 12:500].

In some implementations, the partial bandwidth comprises a 60 MHz partial bandwidth. Moreover, the bandwidth may be an 80 MHz bandwidth with a second 20 MHz frequency subblock of the 80 MHz bandwidth not having the dRU distributed thereon. In such cases, a tone mapping range of a plurality of tones of the dRU may include [−500:−259, 12:500].

In some implementations, the partial bandwidth comprises a 60 MHz partial bandwidth. Moreover, the bandwidth may be an 80 MHz bandwidth with a third 20 MHz frequency subblock of the 80 MHz bandwidth not having the dRU distributed thereon. In such cases, a tone mapping range of a plurality of tones of the dRU may include [−500:−12, 259:500].

In some implementations, the partial bandwidth comprises a 60 MHz partial bandwidth. Moreover, the bandwidth may be an 80 MHz bandwidth with a fourth 20 MHz frequency subblock of the 80 MHz bandwidth not having the dRU distributed thereon. In such cases, a tone mapping range of a plurality of tones of the dRU may include [−500:−12, 12:253].

In some implementations, generation of the dRU over the partial bandwidth may be expressed by: $dRU(r, k)=\Omega(K_{td}(r, k))$. In such cases, $\Omega$ may denote a tone mapping range corresponding to a size of the dRU; r may denote a dRU index; k may denote the natural index or order of dRU subcarriers, $k=0, 1, \ldots, N_{st}-1$; $N_{st}$ may denote a number of subcarriers associated with the dRU; and $K_{td}(r, k)$ may be calculated as $K_{td}(r, k)=RU_{start}(r)+1_{(i)}+j*N_p$. In such cases, $RU_{start}(r)$ may represent a first or starting tone index for $dRU_r$; $1_{(i)}$ may represent tones within one repetition distance or one repetition period; $i=\mod(k, L)=0, 1, 2, \ldots, L-1; j=0, 1, 2, \ldots,$ $$\left\lceil \frac{N_{st\_ru}}{L} \right\rceil - 1;$$

$N_p$ may represent the repetition distance or repetition period; L may represent a number of tones within one repetition distance or one repetition period; $N_{st\_ru}$ may represent the number of subcarriers associated with the dRU; and $N_{ru}$ may represent a number of RUs for a given RU size in the bandwidth.

Illustrative Processes

Figure 8:
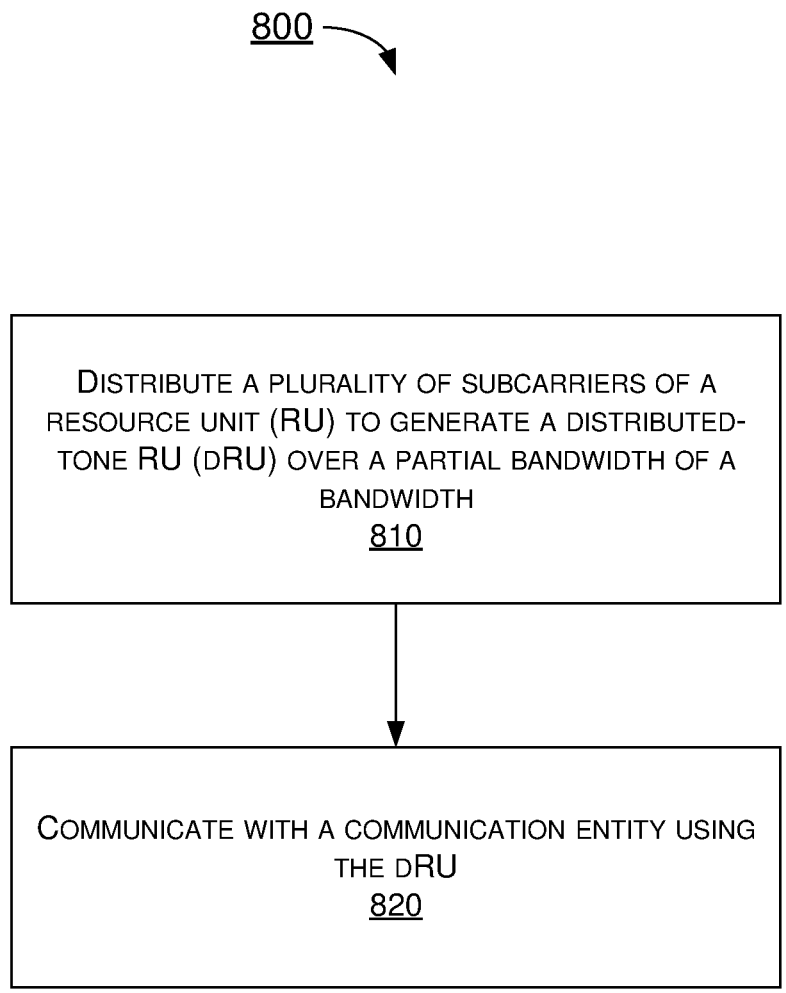
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to designs of dRUs on a partial bandwidth in a 6 GHz LPI system in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 as communication entity 110 (e.g., a transmitting device whether a STA or an AP) and apparatus 720 as communication entity 120 (e.g., a receiving device whether a STA or an AP) of a wireless network such as a WLAN in accordance with one or more of IEEE 802.11 standards. Process 800 may begin at block 810.

At 810, process 800 may involve processor 712 of apparatus 710 distributing a plurality of subcarriers of a RU to generate a dRU over a partial bandwidth of a bandwidth. Process 800 may proceed from 810 to 820.

At 820, process 800 may involve processor 712 communicating, via transceiver 716, with a communication entity (e.g., apparatus 720) using the dRU.

In some implementations, in distributing the plurality of subcarriers of the RU to generate the dRU over the partial bandwidth, process 800 may involve processor 712 distributing the plurality of subcarriers of the RU to generate twenty-seven 26-tone dRUs over a 60 MHz partial bandwidth. In some implementations, first or starting tone indices of the twenty-seven 26-tone dRUs over the 60 MHz partial bandwidth may include {0, 15, 6, 21, 12, 3, 18, 9, 24, 1, 16, 7, 22, 13, 4, 19, 10, 25, 2, 17, 8, 23, 14, 5, 20, 11, 26}, with a repetition period of 27, and tones within one repetition period may include {0}.

In some implementations, in distributing the plurality of subcarriers of the RU to generate the dRU over the partial bandwidth, process 800 may involve processor 712 distributing the plurality of subcarriers of the RU to generate twelve 52-tone dRUs over a 60 MHz partial bandwidth. In some implementations, first or starting tone indices of the twelve 52-tone dRUs over the 60 MHz partial bandwidth may include {0, 6, 3, 9, 1, 7, 4, 10, 2, 8, 5, 11}, with a repetition period of 27, and tones within one repetition period may include {0, 15}.

In some implementations, in distributing the plurality of subcarriers of the RU to generate the dRU over the partial bandwidth, process 800 may involve processor 712 distributing the plurality of subcarriers of the RU to generate six 106-tone dRUs over a 60 MHz partial bandwidth. In some implementations, first or starting tone indices of the six 106-tone dRUs over the 60 MHz partial bandwidth may include {0, 3, 1, 4, 2, 5}, with a repetition period of 27, and tones within one repetition period may include {0, 6, 15, 21}.

In some implementations, in distributing the plurality of subcarriers of the RU to generate the dRU over the partial bandwidth, process 800 may involve processor 712 distributing the plurality of subcarriers of the RU to generate three 242-tone dRUs over a 60 MHz partial bandwidth. In some implementations, first or starting tone indices of the three 242-tone dRUs over the 60 MHz partial bandwidth may include {0, 1, 2}, with a repetition period of 27, and tones within one repetition period may include {0:3:24}.

In some implementations, the partial bandwidth may include a 60 MHz partial bandwidth. Moreover, the bandwidth may be an 80 MHz bandwidth with a first 20 MHz frequency subblock of the 80 MHz bandwidth not having the dRU distributed thereon. In such cases, a tone mapping range of a plurality of tones of the dRU may include [−253:−12, 12:500].

In some implementations, the partial bandwidth comprises a 60 MHz partial bandwidth. Moreover, the bandwidth may be an 80 MHz bandwidth with a second 20 MHz frequency subblock of the 80 MHz bandwidth not having the dRU distributed thereon. In such cases, a tone mapping range of a plurality of tones of the dRU may include [−500:−259, 12:500].

In some implementations, the partial bandwidth comprises a 60 MHz partial bandwidth. Moreover, the bandwidth may be an 80 MHz bandwidth with a third 20 MHz frequency subblock of the 80 MHz bandwidth not having the dRU distributed thereon. In such cases, a tone mapping range of a plurality of tones of the dRU may include [−500:−12, 259:500].

In some implementations, the partial bandwidth comprises a 60 MHz partial bandwidth. Moreover, the bandwidth may be an 80 MHz bandwidth with a fourth 20 MHz frequency subblock of the 80 MHz bandwidth not having the dRU distributed thereon. In such cases, a tone mapping range of a plurality of tones of the dRU may include [−500:−12, 12:253].

In some implementations, generation of the dRU over the partial bandwidth may be expressed by: $dRU(r, k)=\Omega(K_{td}(r, k))$. In such cases, $\Omega$ may denote a tone mapping range corresponding to a size of the dRU; r may denote a dRU index; k may denote the natural index or order of dRU subcarriers, k=0, 1, ..., $N_{st}$–1; $N_{st}$ may denote a number of subcarriers associated with the dRU; and $K_{td}$(r, k) may be calculated as $K_{td}$(r, k)=$RU_{start}$(r)+$l_{(i)}$+j*$N_p$. In such cases, $RU_{start}$(r) may represent a first or starting tone index for $dRU_r$; $l_{(i)}$ may represent tones within one repetition distance or one repetition period; i=mod(k, L)=0, 1, 2, ..., L–1; j=0, 1, 2, ..., $$\left\lceil \frac{N_{st\_ru}}{L} \right\rceil - 1;$$

$N_p$ may represent the repetition distance or repetition period; L may represent a number of tones within one repetition distance or one repetition period; $N_{st\_ru}$ may represent the number of subcarriers associated with the dRU; and $N_{ru}$ may represent a number of RUs for a given RU size in the bandwidth.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
distributing a plurality of subcarriers of a resource unit (RU) to generate a distributed-tone RU (dRU) over a partial bandwidth of a bandwidth; and
communicating with a communication entity using the dRU,
wherein the distributing of the plurality of subcarriers of the RU to generate the dRU over the partial bandwidth comprises distributing the plurality of subcarriers of the RU to generate one of:
twenty-seven 26-tone dRUs over a 60 MHz partial bandwidth, wherein first or starting tone indices of the twenty-seven 26-tone dRUs over the 60 MHz partial bandwidth comprise {0, 15, 6, 21, 12, 3, 18, 9, 24, 1, 16, 7, 22, 13, 4, 19, 10, 25, 2, 17, 8, 23, 14, 5, 20, 11, 26}, wherein a repetition period is 27, and wherein tones within one repetition period comprise {0}; or
twelve 52-tone dRUs over the 60 MHz partial bandwidth, wherein first or starting tone indices of the twelve 52-tone dRUs over the 60 MHz partial bandwidth comprise {0, 6, 3, 9, 1, 7, 4, 10, 2, 8, 5, 11}, wherein a repetition period is 27, and wherein tones within one repetition period comprise {0, 15}; or six 106-tone dRUs over the 60 MHz partial bandwidth, wherein first or starting tone indices of the six 106-tone dRUs over the 60 MHz partial bandwidth comprise {0, 3, 1, 4, 2, 5}, wherein a repetition period is 27, and wherein tones within one repetition period comprise {0, 6, 15, 21}; or three 242-tone dRUs over the 60 MHz partial bandwidth, wherein first or starting tone indices of the three 242-tone dRUs over the 60 MHz partial bandwidth comprise {0, 1, 2}, wherein a repetition period is 27, and wherein tones within one repetition period comprise {0:3:24}.

2. The method of claim 1, wherein the partial bandwidth comprises the 60 MHz partial bandwidth, wherein the bandwidth comprises an 80 MHz bandwidth with a first 20 MHz frequency subblock of the 80 MHz bandwidth not having the dRU distributed thereon, and wherein a tone mapping range of a plurality of tones of the dRU comprises [−253:−12, 12:500].

3. The method of claim 1, wherein the partial bandwidth comprises the 60 MHz partial bandwidth, wherein the bandwidth comprises an 80 MHz bandwidth with a second 20 MHz frequency subblock of the 80 MHz bandwidth not having the dRU distributed thereon, and wherein a tone mapping range of a plurality of tones of the dRU comprises [−500: −259, 12:500].

4. The method of claim 1, wherein the partial bandwidth comprises the 60 MHz partial bandwidth, wherein the bandwidth comprises an 80 MHz bandwidth with a third 20 MHz frequency subblock of the 80 MHz bandwidth not having the dRU distributed thereon, and wherein a tone mapping range of a plurality of tones of the dRU comprises [−500: −12, 259:500].

5. The method of claim 1, wherein the partial bandwidth comprises the 60 MHz partial bandwidth, wherein the bandwidth comprises an 80 MHz bandwidth with a fourth 20 MHz frequency subblock of the 80 MHz bandwidth not having the dRU distributed thereon, and wherein a tone mapping range of a plurality of tones of the dRU comprises [−500:−12, 12:253].

6. A method, wherein comprising:
distributing a plurality of subcarriers of a resource unit (RU) to generate a distributed-tone RU (dRU) over a partial bandwidth of a bandwidth; and
communicating with a communication entity using the dRU,
wherein generation of the dRU over the partial bandwidth is expressed by:

$$dRU\ (r,k)=\Omega(K_{td}(r,k)),$$

wherein:
$\Omega$ denotes a tone mapping range corresponding to a size of the dRU,
r denotes a dRU index,
k denotes a natural index or order of dRU subcarriers, k=0, 1, . . . , $N_{st}$-1,
$N_{st}$ denotes a number of subcarriers associated with the dRU, and
$K_{td}(r, k)$ is calculated as $K_{td}(r, k)=RU_{start}(r)+1_{(i)}+j * N_p$,
$RU_{start}(r)$ represents a first or starting tone index for $dRU_r$,
$I_{(i)}$ represents tones within one repetition distance or one repetition period,
i=mod (k, L)=0, 1, 2, . . . , L−1, j=0, 1, 2, . . . , $$\left\lceil \frac{N_{st\_ru}}{L} \right\rceil - 1,$$

$N_p$ represents the repetition distance or repetition period,
L represents a number of tones within one repetition distance or one repetition period,
$N_{st\_ru}$ represents the number of subcarriers associated with the dRU, and
$N_{ru}$ represents a number of RUs for a given RU size in the bandwidth.

7. An apparatus, comprising:
a transceiver configured to communicate wirelessly; and
a processor coupled to the transceiver and configured to perform operations comprising:
distributing a plurality of subcarriers of a resource unit (RU) to generate a distributed-tone RU (dRU) over a partial bandwidth of a bandwidth; and
communicating, via the transceiver, with a communication entity using the dRU,
wherein, in distributing the plurality of subcarriers of the RU to generate the dRU over the partial bandwidth, the processor is configured to distribute the plurality of subcarriers of the RU to generate one of:
twenty-seven 26-tone dRUs over a 60 MHz partial bandwidth, wherein first or starting tone indices of the twenty-seven 26-tone dRUs over the 60 MHz partial bandwidth comprise {0, 15, 6, 21, 12, 3, 18, 9, 24, 1, 16, 7, 22, 13, 4, 19, 10, 25, 2, 17, 8, 23, 14, 5, 20, 11, 26}, wherein a repetition period is 27, and wherein tones within one repetition period comprise {0}; or
twelve 52-tone dRUs over the 60 MHz partial bandwidth, wherein first or starting tone indices of the twelve 52-tone dRUs over the 60 MHz partial bandwidth comprise {0, 6, 3, 9, 1, 7, 4, 10, 2, 8, 5, 11}, wherein a repetition period is 27, and wherein tones within one repetition period comprise {0, 15}; or
six 106-tone dRUs over the 60 MHz partial bandwidth, wherein first or starting tone indices of the six 106-tone dRUs over the 60 MHz partial bandwidth comprise {0, 3, 1, 4, 2, 5), wherein a repetition period is 27, and wherein tones within one repetition period comprise {0, 6, 15, 21}; or
three 242-tone dRUs over the 60 MHz partial bandwidth, wherein first or starting tone indices of the three 242-tone dRUs over the 60 MHz partial bandwidth comprise {0, 1, 2}, wherein a repetition period is 27, and wherein tones within one repetition period comprise {0:3:24}.

8. The apparatus of claim 7, wherein the partial bandwidth comprises the 60 MHz partial bandwidth, wherein the bandwidth comprises an 80 MHz bandwidth with:
a first 20 MHz frequency subblock of the 80 MHz bandwidth not having the dRU distributed thereon such that a tone mapping range of a plurality of tones of the dRU comprises [−253:−12, 12:500]; or
a second 20 MHz frequency subblock of the 80 MHz bandwidth not having the dRU distributed thereon such that the tone mapping range of the plurality of tones of the dRU comprises [−500:−259, 12:500]; or
a third 20 MHz frequency subblock of the 80 MHz bandwidth not having the dRU distributed thereon such that the tone mapping range of the plurality of tones of the dRU comprises [−500:−12, 259:500]; or
a fourth 20 MHz frequency subblock of the 80 MHz bandwidth not having the dRU distributed thereon such that the tone mapping range of the plurality of tones of the dRU comprises [−500:−12, 12:253].

\* \* \* \* \*